United States Patent [19]

DeLuca

[11] 4,176,257
[45] Nov. 27, 1979

[54] TELEPHONE CONNECTOR BLOCK
[75] Inventor: Paul V. DeLuca, Syosset, N.Y.
[73] Assignee: Porta Systems Corp., Syosset, N.Y.
[21] Appl. No.: 926,574
[22] Filed: Jun. 20, 1978
[51] Int. Cl.$^2$ .......................... H04Q 1/02; H01R 9/00
[52] U.S. Cl. .................................. 179/98; 339/18 R; 361/428
[58] Field of Search ..................... 179/1 PC, 91 R, 98; 361/352, 425, 426, 428; 339/18 R, 198 R, 198 S

[56] References Cited
U.S. PATENT DOCUMENTS

| | | | |
|---|---|---|---|
| 3,535,463 | 10/1970 | Trucco | 179/98 |
| 3,611,268 | 10/1971 | Webb | 361/428 |
| 3,936,133 | 2/1976 | Splitt et al. | 179/98 |
| 4,012,096 | 3/1977 | DeLuca et al. | 179/98 |
| 4,037,910 | 7/1977 | Paluch | 179/98 |
| 4,053,719 | 10/1977 | Debortoli et al. | 179/98 |

Primary Examiner—Kathleen H. Claffy
Assistant Examiner—Randall P. Myers
Attorney, Agent, or Firm—Charles E. Temko

[57] ABSTRACT

An improved telephone connector block construction permitting the convenience of blocks normally connected at parallel sidewalls thereof to be conveniently interconnected at a forwardly facing surface in those installations where side interconnection is not practical or desirable. The construction includes an element providing guiding means for jumper connections leading to the forwardly facing surface including the necessary fanning openings, and a second element forming pin terminal means on said forwardly facing surface. The improved structure permits the mounting of adjacent connector blocks at closer intervals than otherwise possible where specific installation sites require such closer spacing.

3 Claims, 14 Drawing Figures

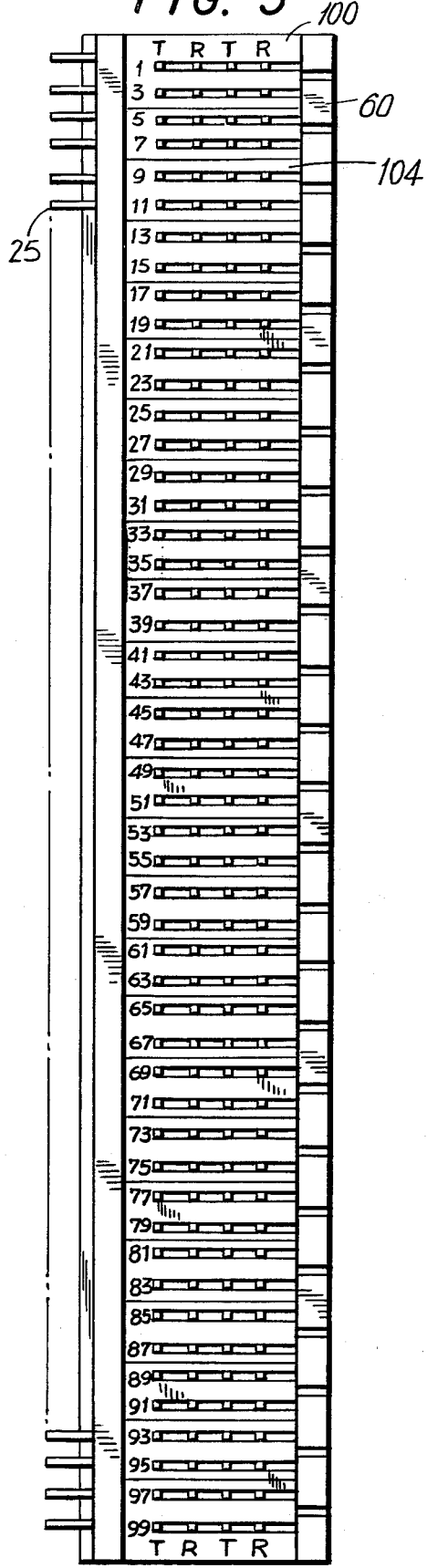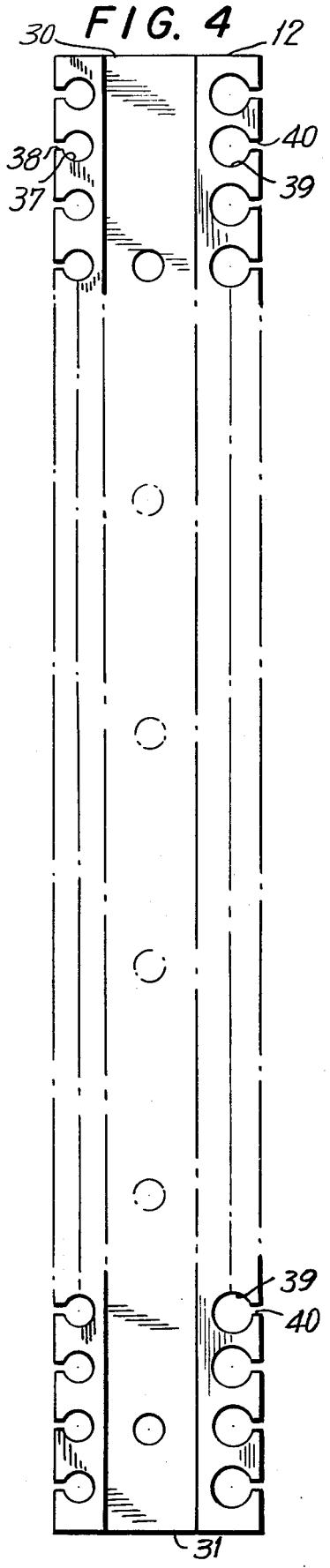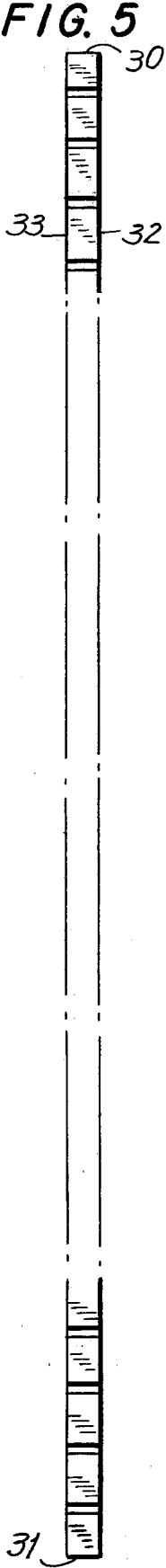

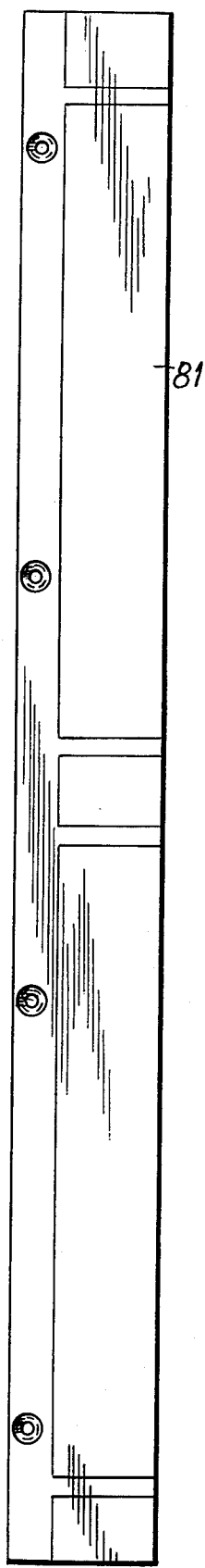
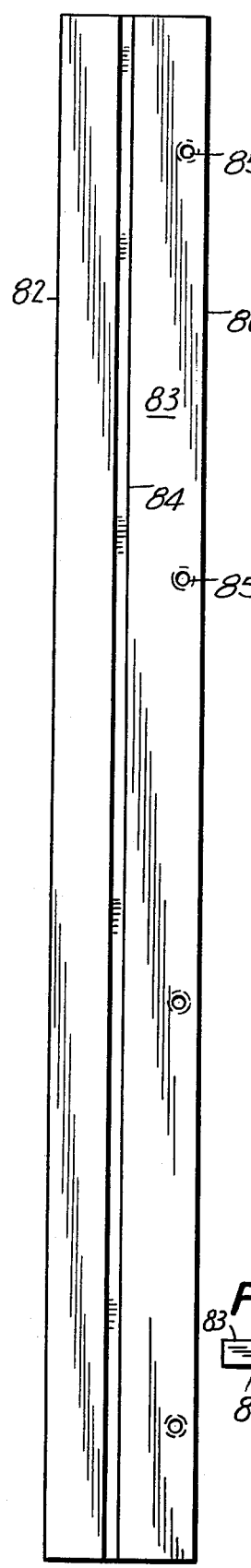
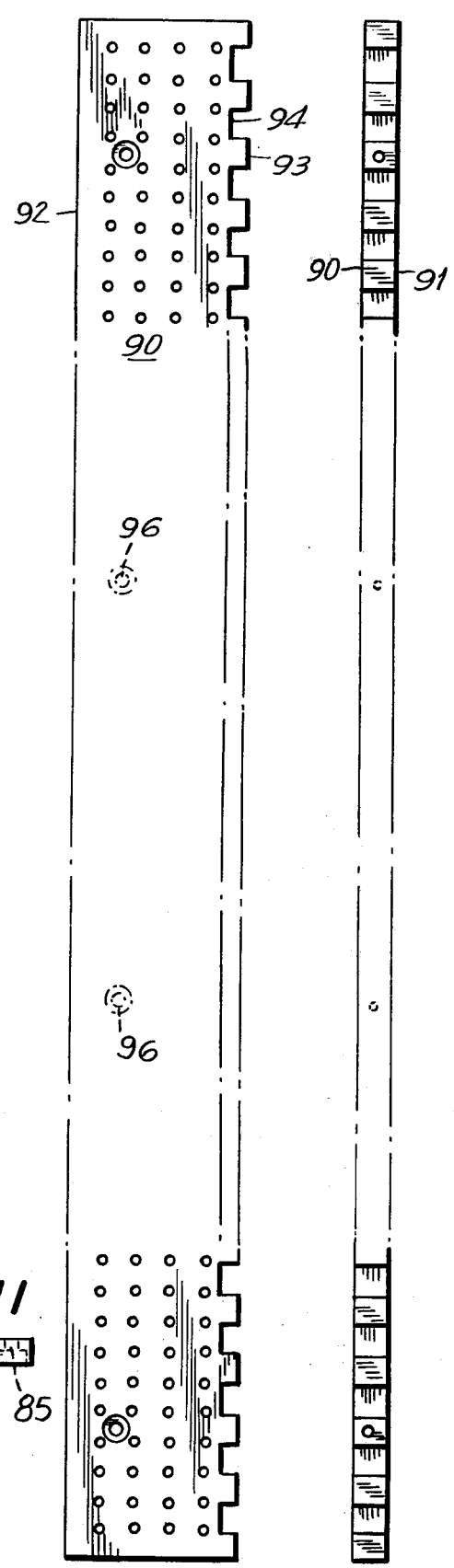

TELEPHONE CONNECTOR BLOCK

BACKGROUND OF THE INVENTION

This invention relates generally to the field of telephony, and more particularly to an improved telephone connector block construction of a type used to interconnect subscriber pairs to office switching equipment.

In patent application Ser. No. 583,781, filed June 4, 1975, now U.S. Pat. No. 4,012,096, dated Mar. 15, 1977 and assigned to the same assignee as the present application, there is disclosed a connector block in which the main body thereof is of generally planar configuration and is mounted in vertical orientation such that pairs of oppositely positioned surfaces are exposed to present pin terminal connecting points on each surface. Plural numbers of such blocks are mounted in mutually parallel relation upon a frame, leaving sufficient space therebetween to permit access to the terminal pins to permit wire wrapping devices on one side, and the usual plug type connectors, often employing protective components on the other side. Since the blocks are considerably deeper than wide, this construction permits maximum utilization of the available space on the frame which mounts the blocks in terms of the number of subscriber pairs accommodated per unit of frontal area.

There are occasions, however, where the minimum permissible space between adjacent connector blocks is not available, and accordingly, the use of wire wrapping devices for placing the ends of jumper conductors upon the connector pins of the block is not possible. Older types of connector blocks having forwardly projecting terminal pins may, of course, be employed. Such blocks normally require much more frontal area per subscriber pair because of the necessity of also mounting the connector modules on a forwardly facing surface as well.

SUMMARY OF THE INVENTION

Briefly stated, the invention contemplates the provision of an improved telephone connector block of the class described, in which most of the space saving advantages of the above described connector block have been retained, while making provision for the forward exposure of the wire wrapped connector pins. The connector modules, of conventional type, are still engaged upon a side surface rather than a frontal surface. The connector pins extending from an opposite surface are bridged by jumper connections to a forwardly facing field of connector pins using a protective cover forming conductor guides. In ideal form, the inventive structure is adaptable to supplement the above described device, using a substantial amount of existing hardware.

BRIEF DESCRIPTION OF THE DRAWINGS

In the drawings, to which reference will be made in the specification, similar reference characters have been employed to designate corresponding parts throughout the several views.

FIG. 3 is a front elevational view thereof.

FIG. 4 is a front elevational view of a fanning strip comprising a part of the embodiment.

FIG. 5 is a side elevational view of the fanning strip as seen from the right hand portion of FIG. 4.

FIG. 9 is a side elevational view of a support element forming a part of the embodiment.

FIG. 10 is a side elevational view thereof showing the side opposite that seen in FIG. 9.

FIG. 11 is a bottom plan view thereof.

FIG. 12 is a front elevational view of a pin block forming part of the embodiment.

FIG. 13 is a side elevational view as seen from the left hand portion of FIG. 12.

DETAILED DESCRIPTION OF THE DISCLOSED EMBODIMENT

Figure 1:
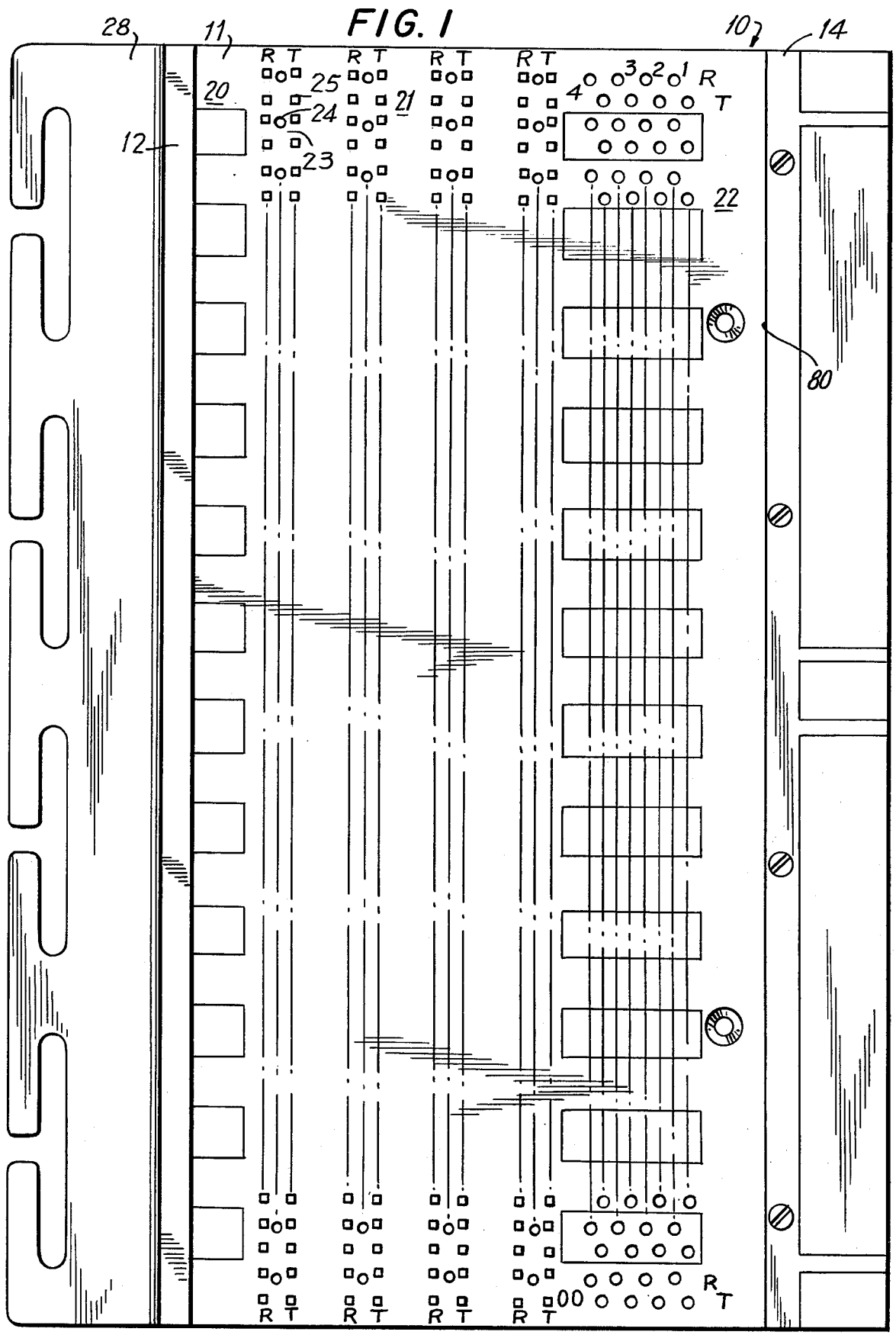
FIG. 1 is a side elevational view of an embodiment of the invention.
Figure 2:
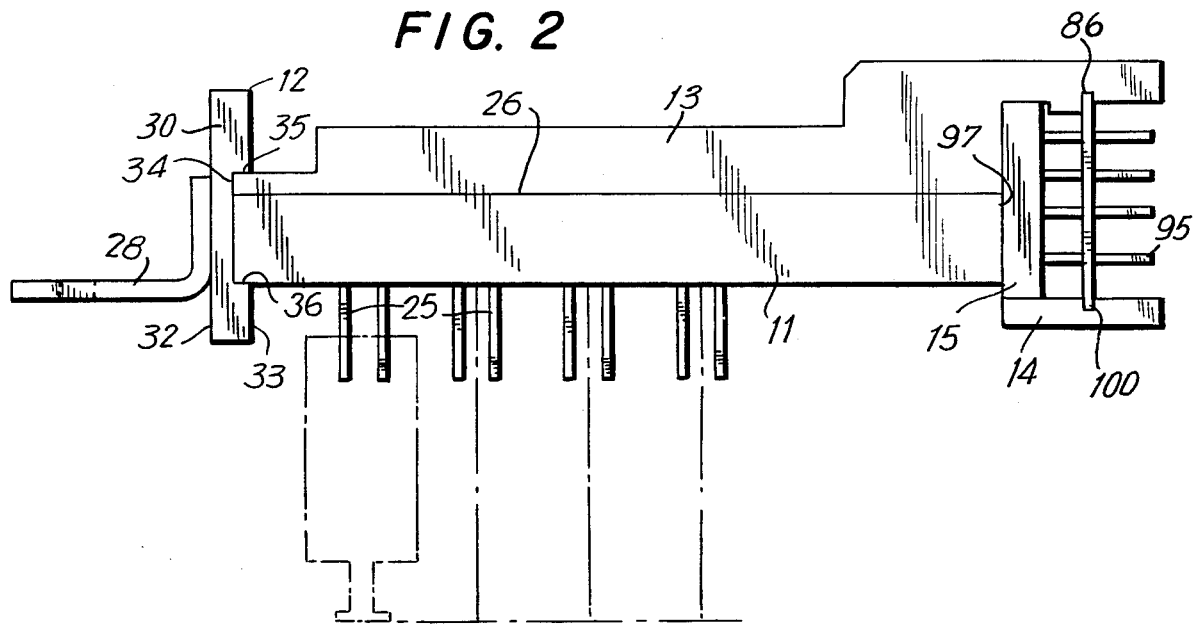
FIG. 2 is a top plan view thereof.

In accordance with the invention, the device, generally indicated by reference character 10, comprises broadly: a main panel element 11, a fanning strip element 12, a back cover element 13, a support element 14, and a pin block element 15.

The main panel element 11 is generally similar to that disclosed in the above mentioned patent, and is preferably formed as a unitary molding from synthetic resinous materials. A first planar surface 20 includes a connector module area 21 and corresponding test panel areas 22. The marginal area 21 includes a plurality of individual socket areas 23 having an orifice 24 for the reception of the grounding prong on a connector module of known type. Groups of four projecting pins 25 provide for connection of the usual tip and ring circuits.

Figure 6:
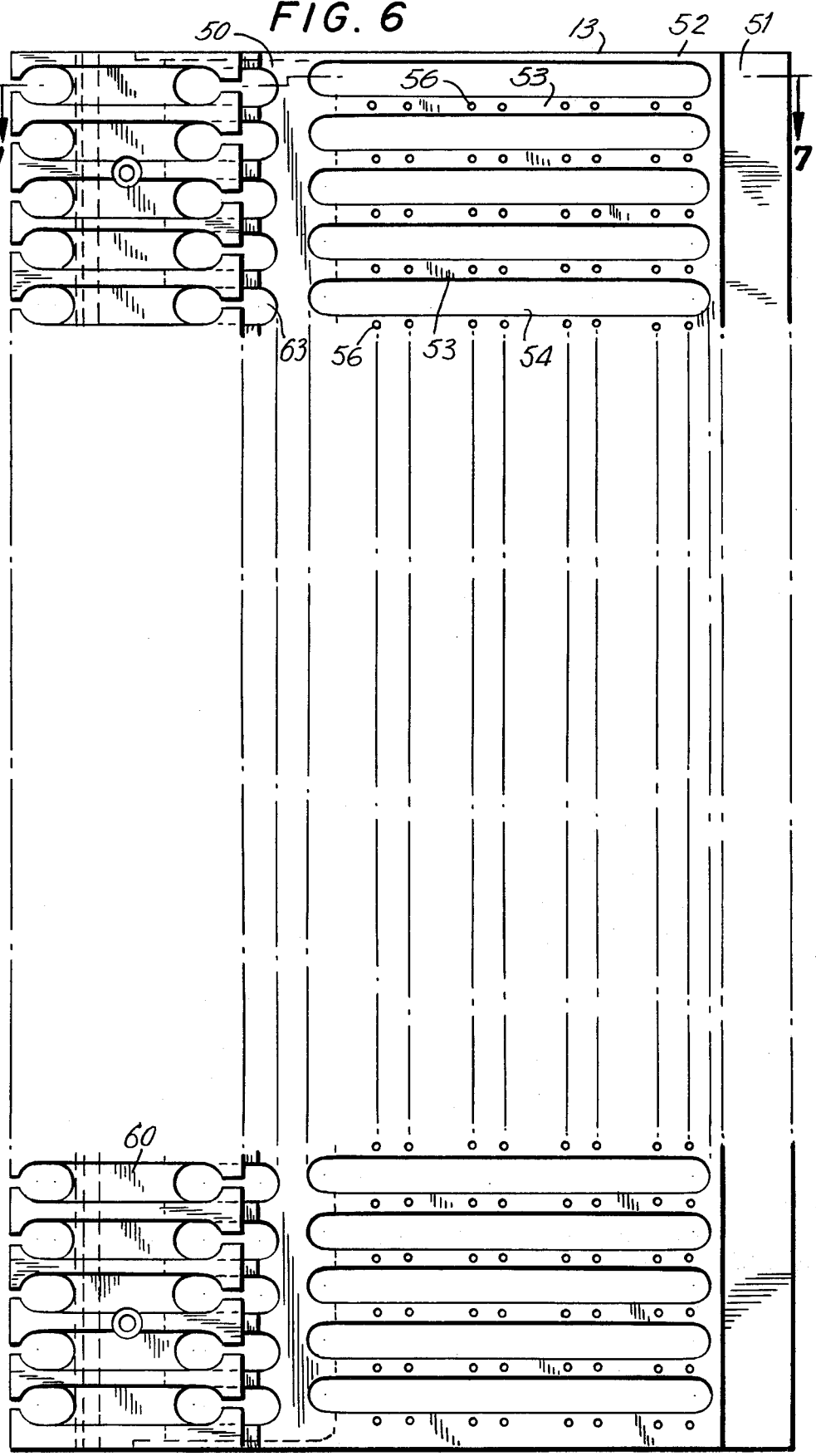
FIG. 6 is a side elevational view of a back cover element comprising a part of the embodiment.

A second oppositely disposed planar surface 26 underlies the cover element 13, and as best seen in FIG. 6 in the drawing, includes projecting pins 27, some of which communicate with the pins on the first planar surface 20 in well known manner. A mounting bracket 28 permits the device to be mounted on a known telephone frame (not shown) in standard manner. The bracket 28 is attached from the rear using detachable screws, as is known in the art.

The fanning strip element 12 is also preferably formed as a unitary molding, and is bounded by an upper surface 30, a lower surface 31, a rearward surface 32 and a forward surface 33. The surface 33 includes a rectangular recess 34 which receives the rear edge of the main panel element 11, located between a left hand side surface 35 and a right hand surface 36. A first set of bores 37 communicates with fanning slots 38, and a second set of bores 39 communicates with slots 40, thereby facilitating the fanning of conductors which extend rearwardly of the main panel element 11.

Figure 7:
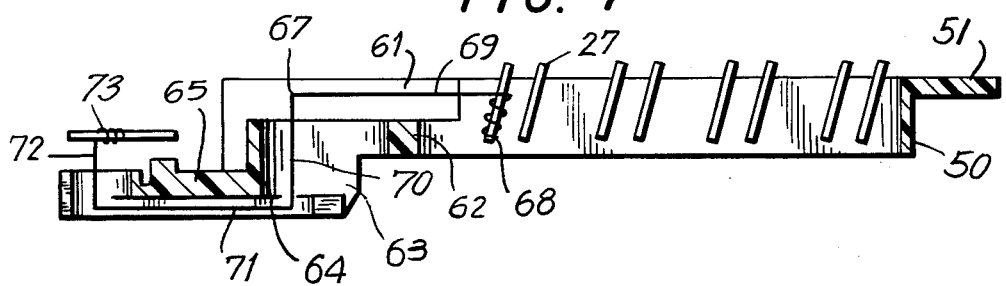
FIG. 7 is a transverse sectional view as seen from the plane 7—7 in FIG. 6.

Referring to FIGS. 6 and 7, the cover element 13 includes a main body portion 50 having an edge wall 51 and a rearwardly extending member 52 (FIG. 7). A plurality of septums 53 define elongated channels 54 overlying connector pins 27. A plurality of bores 56 are integrally molded for the reception of corresponding pins on an optional supplementary cover (not shown) which can be used to overlie selective portions of the cover element 13 as required for individual installations.

The cover element 13 includes a perforated intermediate wall 60 forming a conductor passage 61, as well as a vertical wall 62, a horizontal wall 63, a second vertical wall 64 and a second horizontal wall 65. The configuration is such as to define an enclosed passage for jumper conductors to interconnect the pins 27 with the pins on the pin block element 15, as will more fully appear hereinafter. For purposes of clarity, a single conductor path 67 is indicated in the drawing, in which a single pin 68 is interconnected with a wire wound conductor having segments 69, 70, 71, 72 and a wire wound terminal 73 leading past the forward edge of the element 15.

Referring to FIGS. 9, 10, and 11 in the drawing, the support element 14 is also in the form of a unitary molding, and is bounded by a rear surface 80, an outer surface 81, a forward surface 82 and an inner surface 83. A continuous groove 84 extends into the inner surface 83. Openings 85 provide for mounting the support element on the block element 15 using screw means.

The pin block element 15 is generally rectangular in configuration and is bounded by a forward surface 90, a rearward surface 91, a first side surface 92, and a second side surface 93 having notches 94 therein at regular intervals through which portions of the jumper conductors extend to be wrapped about individual conductor pins 95 which extend from the forward surface 90. Screw openings 96 provide for the mounting of the element 15 upon a forwardly facing surface 97 of the element 11.

Figure 14:
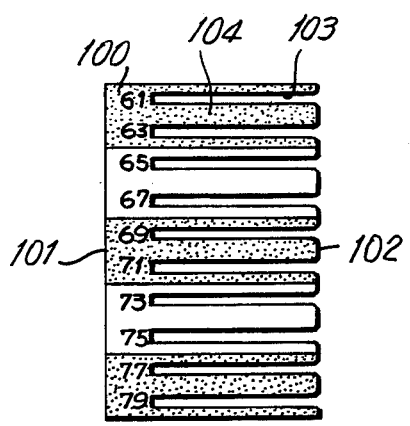
FIG. 14 is a front elevational view of a pin comb marking member forming a part of the embodiment.
Figure 8:
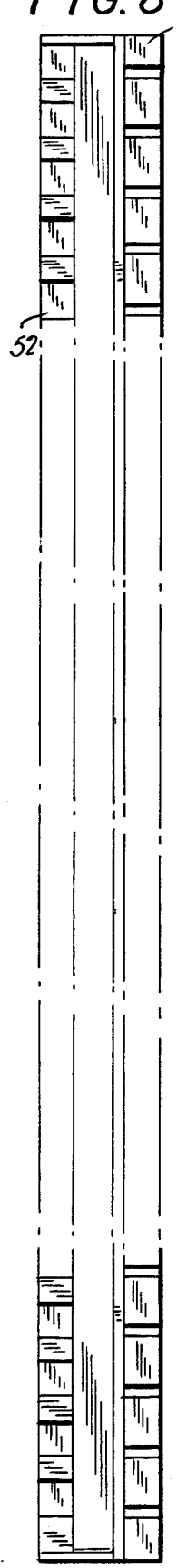
FIG. 8 is a view in elevation as seen from the left hand portion of FIG. 6.

Supported between the support element 14 and a forwardly extending portion of the cover element 13 are a plurality of pin comb marking members 100 (best seen in FIG. 14 in the drawing.) Each member 100 is bounded by a pair of side edges 101 and 102, each edge being engaged in either the groove 84 in the support element or the groove 86 in the cover element. Extending into the plane of the member 100 from the side edge 102 are a plurality of elongated slots 103, each engaging a specific row of pins on the block element 15. The forward surface 104 is provided with suitable indicia for identifying individual subscriber pairs.

As will be apparent from a consideration of the drawing, the device 10 is preferably completely wired before installation of the cover element 13, at which time, substantially the entire length of the jumper conductors are completely shielded, and yet readily available for identification. With the transfer of the effective location of terminals on the second surface 26 to the exposed surface of the block element 15, it is possible to place the individual devices in much closer mutual spacing than has heretofore been possible. As the wire wrapping operations are largely confined to the terminal pins on the surface 26, by jumping the connections to the forward surface of the device, very little accessibility to the second surface is then required. As compared with the known device which it replaces, in essence it is necessary only to provide the cover element 13, the support element 14 and the pin block element 15 to permit the transfer of connections from the side surface to the forwardly exposed surface of the device.

I wish it to be understood that I do not consider the invention limited to the precise details of structure shown and set forth in this specification, for obvious modifications will occur to those skilled in the art to which the invention pertains.

I claim:

1. Improved telephone connector block structure comprising: a generally planar main panel element having a pair of oppositely disposed principal surfaces, mutually interconnected connector pins projecting from each of said surfaces, said panel elements having an end edge surface interconnecting with said pair of surfaces; a pin block element of generally planar configuration and having first and second oppositely disposed principal surfaces, said first surface being mounted upon said end edge surface, there being a plurality of connector pins extending from said second surface, the axes of said pins lying in plane substantially parallel to the plane of said panel element; and a plurality of jumper conductors interconnecting at least some of the pins on one of said pair of principal surfaces with corresponding pins on said pin block element; a cover element overlying said last-mentioned jumper conductors, and an edge surface of said pin block element; said cover element extending past said pin block element and defining a groove, a support element carried by said pin block element on a side opposite that contacting said cover element and defining a second oppositely disposed groove; and a pin comb marking member having first and second side edges, each disposed within one of said grooves, said marking member having transversely extending slots therein, each slidably engageable with individual rows of pins on said pin block element.

2. Connector block structure in accordance with claim 1, further characterized in said marking member contacting said pins in a plane parallel to said second surface of said pin block element, to define a generally planar interstice therebetween, a free end of said jumper connectors being wound about respective pins within said interstice.

3. Connector block structure in accordance with claim 2, further characterized in said pin block element having a side edge thereof having notches therein for the passage of medially disposed portions of said jumper conductors therethrough.

* * * * *